United States Patent
Piwonka et al.

[15] 3,682,458
[45] Aug. 8, 1972

[54] MELTING OF REFRACTORY AND REACTIVE METALS

[72] Inventors: Thomas S. Piwonka, North Canton; James V. Hanna, Minerva, both of Ohio

[73] Assignee: TRW Inc., Cleveland, Ohio

[22] Filed: Dec. 29, 1969

[21] Appl. No.: 888,252

[52] U.S. Cl.............266/33 R, 219/10.41, 164/251, 13/27
[51] Int. Cl............................................C21b 11/00
[58] Field of Search......13/26, 27; 219/10.41, 10.67, 219/10.49, 10.43; 164/51, 80, 251; 266/1 R, 5 E, 33 R, 33 T, 34 V; 75/84, 84.1

[56] References Cited

UNITED STATES PATENTS

| | | | |
|---|---|---|---|
| 2,871,533 | 2/1959 | Swainson | 266/33 R |
| 3,435,878 | 4/1969 | Howard et al. | 164/51 |
| 3,484,840 | 12/1969 | Spoth et al. | 13/27 |
| 2,787,536 | 4/1957 | Spedding et al. | 75/84.1 |
| 3,014,255 | 12/1961 | Bussard et al. | 164/251 |

FOREIGN PATENTS OR APPLICATIONS

| | | | |
|---|---|---|---|
| 991,240 | 5/1965 | Great Britain | 164/80 |

*Primary Examiner*—Gerald A. Dost
*Attorney*—Hill, Sherman, Meroni, Gross & Simpson

[57] ABSTRACT

Method and apparatus for melting metals which have a tendency to become contaminated by exposure to materials contained in conventional crucibles, wherein the slug of the metal to be melted is supported in spaced relation to the walls of the crucible and a metallic disc is positioned within the crucible to close off the pour hole. The conditions are maintained such that during the melting of the slug, the disc is not heated to a melting temperature, but once the slug is melted sufficiently, the disc is heated to a melting temperature whereby the molten material resulting from the slug melts through the disc and forms its own pour hole.

5 Claims, 5 Drawing Figures

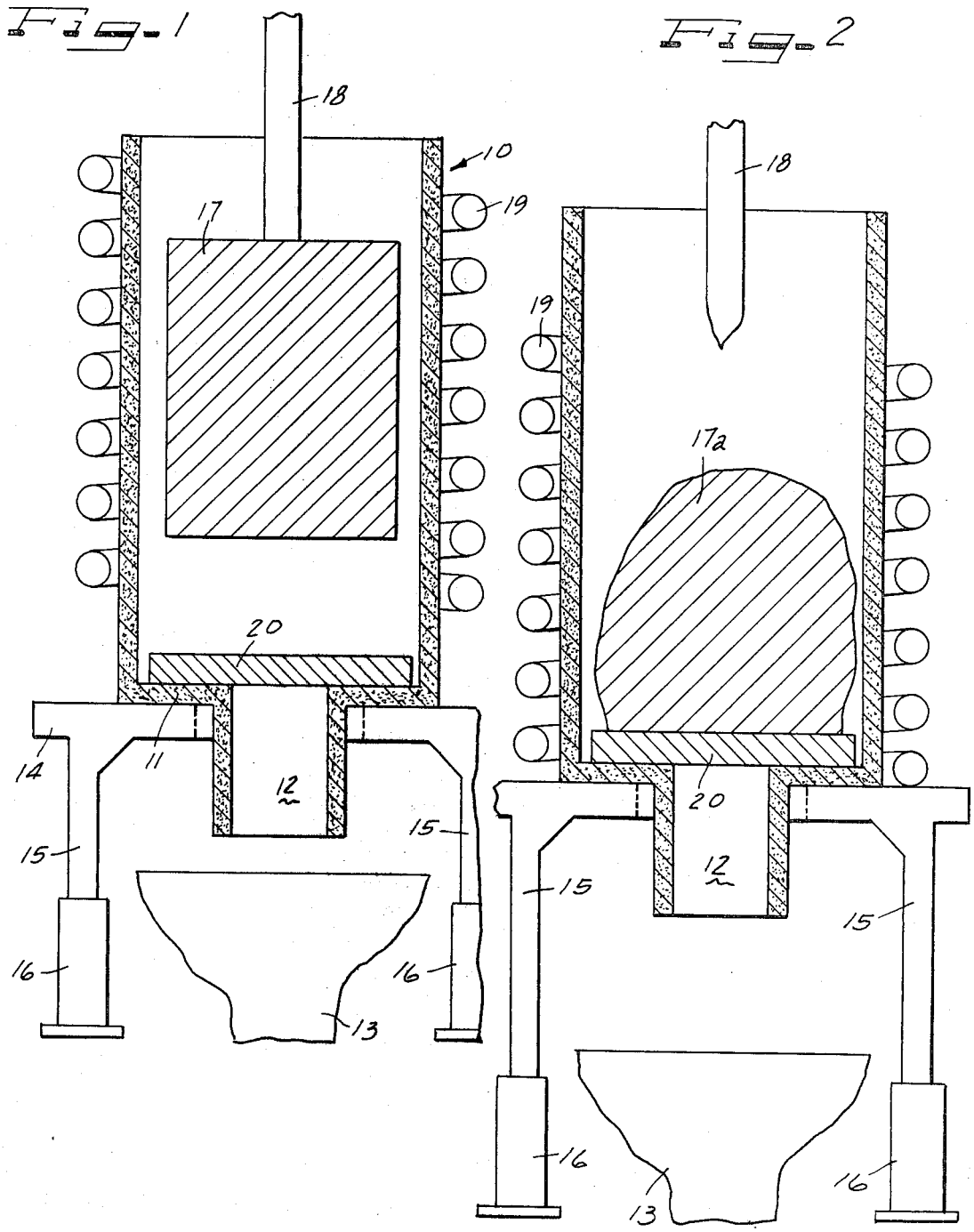

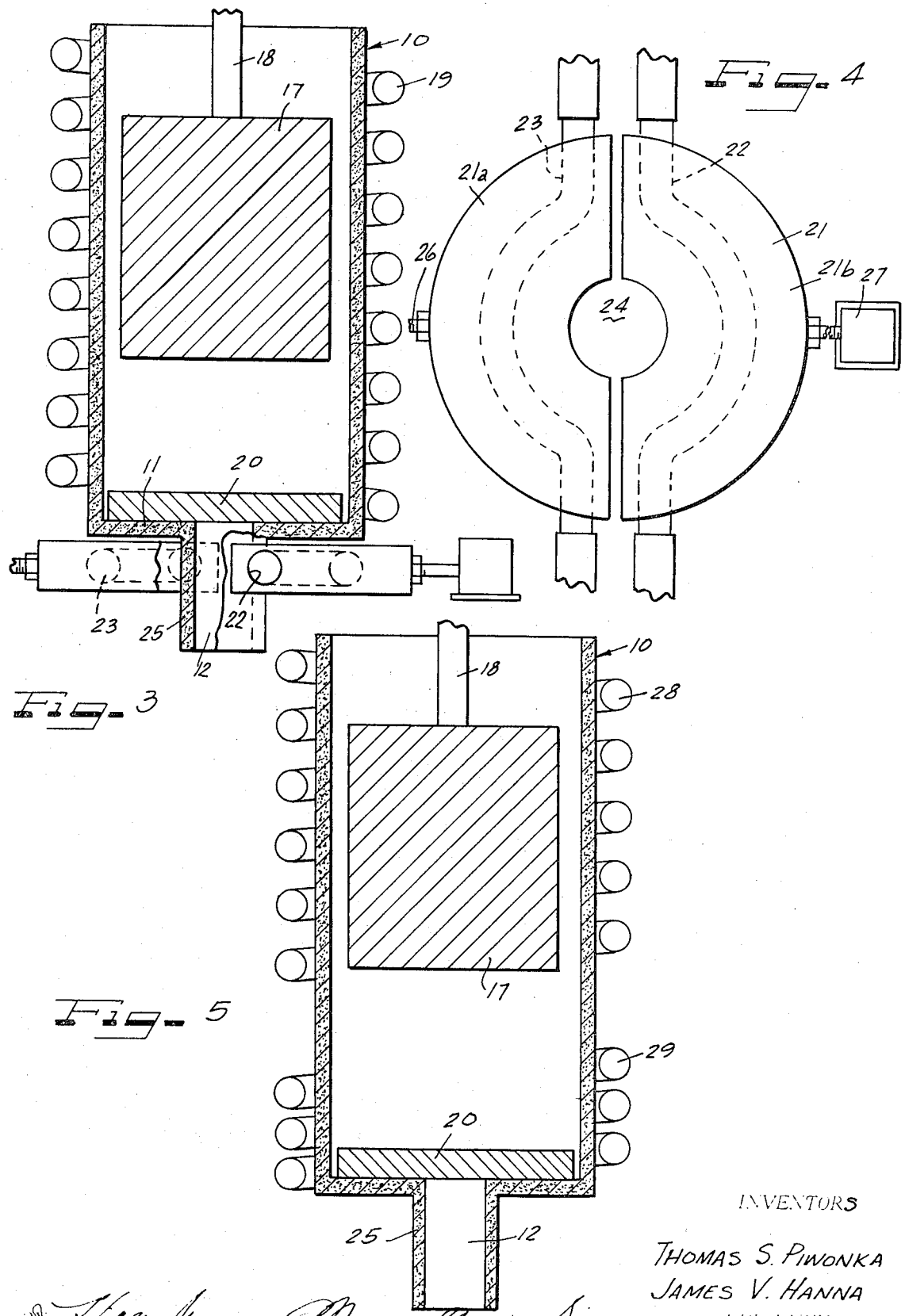

MELTING OF REFRACTORY AND REACTIVE METALS

CROSS REFERENCE TO RELATED APPLICATION

This application constitutes an improvement in the subject matter of Clyde C. Clark, U.S. Ser. No. 767,168 filed Oct. 14, 1968 now U.S. Pat. No. 3,598,168 issued Aug. 10, 1971, and entitled "Titanium Casting Process", assigned to the same assignee as the present application.

BACKGROUND OF THE INVENTION

1. Field of the Invention

This invention is in the field of melting metals (and the term metals used herein also includes alloys of the metals containing at least 50 percent of the metal) such as titanium, zirconium, hafnium and thorium. It provides a crucible assembly wherein a slug of the metal to be melted is suspended in spaced relation to the walls of the crucible and also to the pour hole. The disc of metal which may be of the same composition as the slug or may include significant amounts of alloying ingredients for the metal of the slug is positioned over the pour hole. The slug is first melted so that it deposits on the metal of the disc, whereupon the disc is subjected to melting temperatures resulting in the melting of the disc itself to permit the contents of the crucible to be transferred to a mold or the like.

2. Description of the Prior Art

Highly reactive metals such as titanium, zirconium, hafnium, columbium and thorium are difficult to melt because of their great tendency to react with the crucible, tending to destroy the crucible, and contaminating the melt. Titanium, particularly, has a strong affinity for hydrogen, nitrogen, oxygen and carbon. Carbon and oxygen cause titanium alloys to become embrittled, and the resulting brittle surface layer must be removed by pickling, grinding or machining.

Significant improvements in the melting of titanium have been provided by using an induction furnace assembly in which a plug or a disc of the metal is used to close off the pour hole of the crucible. Examples of this type of disclosure will be found in the Scriver U.S. Pat. No. 2,780,666 issued Feb. 5, 1957; Howard et al., U.S. Pat. No. 3,435,878 issued Apr. 1, 1959; and, Spoth and Chandley U.S. Pat. No. 3,484,840 issued Dec. 16, 1969.

Further improvements in this technique have been made as illustrated in the aforementioned Clark patent. In the method described in that application, a slug of metal is suspended on a rod in a crucible so that it does not touch the crucible walls or bottom. The crucible has a pour hole in its base which is covered with a thin disc of the material to be melted. The assembly is positioned in the field of an induction coil so that the field operates primarily on the slug, causing it to melt off the rod and onto the disc. By increasing the power supplied once the slug is first melted, the molten mass is superheated sufficiently so that it melts the disc and falls through the hole in the crucible.

The method of the Clark patent has been successfully employed in casting highly refractory and reactive metals, but there has been a problem presented in connection with the positioning of the crucible. If the crucible is too high with respect to the coil, a significant part of the field of the coil operates on the disc, causing it to melt before the slug melts. If the crucible is too low, not enough power is transmitted to the molten mass to permit it to melt the disc. In addition, the amount of superheat imparted to the melt is controlled by the disc thickness, so that the disc must be precisely machined or formed for each melt, requiring an expensive operation for each charge of material.

SUMMARY OF THE INVENTION

The present invention provides a method and apparatus in which positive means are employed to insure melting of the disc at the appropriate time and not relying upon the presence of a disc of critical proportions. In the method of the present invention, a slug of the metal to be melted is supported in spaced relation to the walls of the crucible, and the slug is inductively heated until it drops onto the disc. During this time interval, the disc is at a temperature less than its melting point. Subsequent to the initial melting of the slug, the disc is inductively heated to its melting point to cause the molten charge resulting from the slug to pass through the disc and out of the pour hole of the crucible.

The control of the melting conditions in the crucible can be accomplished in a number of means. For one, the disc and the inductive heating field can be moved relative to each other once initial melting of the slug has been accomplished to position the disc in the inductive heating field, and initiating the melting of the disc. Another means for securing this selective heating of slug and disc is to shield the disc from the inductive heating field during the melting of the slug and removing the shielding to place the disc within the inductive heating field when the disc is to be melted. Still another means for providing this selective heating is to employ a crucible with separately energizable heating means for the slug and the disc, and controlling energization of the two so that melting of the disc is accomplished only after melting of the slug has already taken place.

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which:

FIG. 1 is a somewhat schematic view of a crucible and mold assembly, partially in cross section, illustrating the conditions existing at the beginning of the melting cycle;

FIG. 2 is a view similar to FIG. 1 but illustrating the position of the components during a succeeding portion of the cycle in which the disc is being melted;

FIG. 3 is a somewhat schematic view of a modified form of the present invention;

FIG. 4 is a plan view of the shielding means employed in the assembly of FIG. 3; and FIG 5 is a somewhat schematic representation of a still further modified form of the present invention.

DESCRIPTION OF THE PREFERRED EMBODIMENTS

In FIG. 1, reference numeral 10 indicates generally a crucible for the melting of a refractory metal, and composed of graphite or the like. Alternatively, the crucible can be composed of a ceramic material with an inner liner of graphite for use in conjunction with inductive heating. The crucible 10 has a base 11 in which there is formed a pour hole 12 for directing the molten material from the crucible into a mold 13. The crucible 10 is supported on a table 14 which has legs 15 arranged for vertical movement within supports 16, thereby providing a capability of up and down motion for the crucible 10.

A slug 17 of refractory, reactive metal such as a titanium alloy is supported in spaced relation to the walls and base of the mold 10 by means of a support rod 18. In its supported relation, the slug 17 is surrounded by an inductive heating field provided by an induction coil 19 mounted about the outer wall of the crucible 10.

The pour hole 12 of the mold assembly is initially closed off by a disc 20 of metal which in the embodiment illustrated in FIGS. 1 and 2 is located outside the effective heating field provided by the induction heating coil 19. The disc 20 may be composed of a metal which is identical in chemical composition to the metal of the slug 17, or may be composed predominantly of alloying ingredients for alloying with the metal of the slug 17.

With the slug 17 supported as shown in FIG. 1, the coil 19 is energized sufficiently so that the slug 17 begins to melt and thereby falls off the support rod 18 to form a deposit 17a on the disc 20. When this occurs, the crucible 10 and the slug 20 are bodily lifted by means of the legs 15 to a position where the disc 20 is received within the heating field provided by the inductive heating coil 19, as illustrated in FIG. 2 of the drawings. The heating is continued for a sufficient time so that the disc 20 melts, permitting the now molten deposit 17a to flow through the hole thus created in the disc 20 and through the pour hole 12 into the mold 13.

An alternative embodiment of the invention is illustrated in FIGS. 3 and 4 of the drawings. The crucible assembly there illustrated is identical to that shown in FIGS. 1 and 2, with a slug 17 of metal to be melted being supported on a support rod 18 in spaced relation to the walls of the crucible 10. In this instance, however, the disc 20 is located within the field of the inductive heating coil 19. In order to prevent premature melting of the disc, while melting of the slug 17 is occurring, there is provided an electrically conductive shield 21 composed of a good heat conductor such as copper, aluminum, or silver. Heat is abstracted from the disc 20 to prevent melting by circulating a coolant through a pair of conduits 22 and 23 contained within the shield 21. As best illustrated in Figure 4, the shield 21 consists of two sections 21a and 21b which cooperate to define a central aperture 24 which is of sufficient diameter to accommodate the neck 25 which forms the pour hole 12. The shields 21a and 21b can be retracted by use of suitable retracting means generally identified at numerals 26 and 27.

The presence of the shield 21 serves to cool the disc 20 in two ways. For one, it thermally cools the crucible bottom 11, removing heat by virtue of its thermal conductivity to the coolant. The cool crucible bottom, in turn, cools the disc 20. The shield 21 also acts as a conductor for that part of the induction field which would normally heat the disc thus making the field ineffective in this area.

After the slug 11 has been melted, the two halves 21a and 21b of the shield 21 are removed from the crucible bottom and from the area of the induction field. This allows the field to act on the disc 20 and melt it, so that the molten metal of the slug 17 and the disc 20 can then pass through the pour hole 12 into the mold 13.

In the embodiment shown in Figure 5, a slug 17 of the metal to be melted is again shown supported on a support rod 18 in spaced relation to the walls and bottom of the crucible 10. The disc 20 is shown closing off the pour hole 12 as in the previous embodiments. However, in this case there is provided a split coil arrangement for the induction heating field, consisting of a coil 28 surrounding the slug 17 and a coil 29 surrounding the disc 20. The coils 28 and 29 may be separately energized portions of the same coil, or they may be separate coils. In use, the coil 28 is energized first to provide a high temperature melting field for the slug 17. After initial melting of the slug, causing it to fall upon the disc 20, the coil 29 is energized rapidly to a high temperature so that the disc 20 melts while permitting molten metal to flow out of the pour hole 12.

With the device of the present invention, it is possible to provide greater control over the time of pour of the molten metal. The metal can be superheated to any desired degree before the field is permitted to melt the disc. With high power inputs customarily used, disc melting is rapid, on the order of ten seconds or less.

Another advantage of the procedures set forth is that precision control of the disc thickness is no longer necessary, as the disc will be melted when the charge is at the proper temperature.

We claim as our invention:

1. The method of melting a refractory, reactive metal which comprises suspending a solid slug of the metal to be melted in spaced relation to the walls of a crucible by means of a support which releases the slug when it begins to melt, said crucible having an aperture therein directly below said slug and a disc of a metal closing off said aperture, inductively heating the slug until it drops onto said disc, maintaining said disc at a temperature less than its melting point until said slug begins to melt and drops on said disc, and after said slug has been deposited on said disc, passing inductive heating currents through said disc sufficient to melt the same and permit the melted slug metal to pass through said aperture.

2. The method of claim 1 in which said disc and the induction heating field are moved closer to each other after the slug has been deposited on the disc to initiate the melting of said disc.

3. The method of claim 1 in which said disc is shielded from the inductive heating field during melting of said slug and the shielding is thereafter removed to place said disc within the inductive heating field for melting the same.

4. The method of claim 1 in which said disc contains an alloying ingredient for alloying with the metal of said slug.

5. The method of claim 1 in which both said slug and said disc are positioned within the inductive heating field during the melting of the slug, and heat is abstracted from the disc during the melting of the slug to maintain the disc below its melting point.

* * * * *